United States Patent
Sawada (10) Patent No.: US 12,462,429 B2
(45) Date of Patent: Nov. 4, 2025

(54) IMAGE PROCESSING DEVICE AND METHOD OF GENERATING PHYSICAL INTRINSIC IDENTIFICATION KEY

(71) Applicant: SK hynix Inc., Icheon-si (KR)

(72) Inventor: Ken Sawada, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 159 days.

(21) Appl. No.: 18/447,879

(22) Filed: Aug. 10, 2023

(65) Prior Publication Data

US 2024/0282005 A1 Aug. 22, 2024

(30) Foreign Application Priority Data

Feb. 16, 2023 (KR) ........................ 10-2023-0020826

(51) Int. Cl.
*G06T 7/80* (2017.01)

(52) U.S. Cl.
CPC ...................................... *G06T 7/80* (2017.01)

(58) Field of Classification Search
CPC ........................................................ G06T 7/80
See application file for complete search history.

(56) References Cited

U.S. PATENT DOCUMENTS

| | | | | |
|---|---|---|---|---|
| 7,129,973 B2* | 10/2006 | Raynor | ............... | H04N 1/32128 348/231.3 |
| 8,700,641 B2* | 4/2014 | Covell | ................... | G06F 16/683 707/758 |
| 8,996,810 B2* | 3/2015 | Liang | ................... | G06F 16/2365 711/119 |
| 11,706,544 B2* | 7/2023 | Sawada | ................... | H04N 25/77 348/308 |
| 2007/0124756 A1* | 5/2007 | Covell | ................... | G06F 16/635 348/E7.071 |
| 2016/0156972 A1* | 6/2016 | Oztaskent | .......... | G06Q 30/0246 725/14 |
| 2017/0094349 A1* | 3/2017 | Maughan | ......... | H04N 21/44226 |
| 2019/0373195 A1* | 12/2019 | Minagawa | ............. | H04N 25/78 |
| 2021/0211312 A1* | 7/2021 | Lu | ......................... | H04L 9/3278 |

OTHER PUBLICATIONS

Duhyun Jeon et al., A Physical Unclonable Function With Bit Error Rate < $2.3 \times 10^8$ Based on Contact Formation Probability Without Error Correction Code, IEEE Journal of Solid-State Circuits, vol. 55, No. 3, Mar. 2020, pp. 805-816.
LINE Blockchain Developers Docs, Step 8. Transfer FTs, May 19, 2023, URL: https://docs-blockchain.line.biz/service-tutorial/Step8.

* cited by examiner

*Primary Examiner* — Michael B. Pierorazio
(74) *Attorney, Agent, or Firm* — WILLIAM PARK AND ASSOCIATES LTD.

(57) ABSTRACT

An image processing device may include: a noise information manager for managing noise information of a target image sensor and a reference image sensor. It may also include a physical intrinsic identification key generator, which generates a physical intrinsic identification key of the target image sensor, based on a difference between noise signals output from pixels of the target image sensor that are adjacent to each other. An intrinsic image generator generates intrinsic image data, which includes the physical intrinsic identification key of the target image sensor.

19 Claims, 9 Drawing Sheets

IMAGE PROCESSING DEVICE AND METHOD OF GENERATING PHYSICAL INTRINSIC IDENTIFICATION KEY

CROSS-REFERENCE TO RELATED APPLICATION

The present application claims priority under 35 U.S.C. § 119(a) to Korean patent application number 10-2023-0020826 filed on Feb. 16, 2023, in the Korean Intellectual Property Office, the entire disclosure of which is incorporated by reference herein.

BACKGROUND

1. Technical Field

The present disclosure generally relates to an image processing device, and more particularly, to an image processing device having an image sensor and a method of generating a physical intrinsic identification key for the image sensor.

2. Related Art

Image sensors may be generally divided into Charge Coupled Device (CCD) image sensors and a Complementary Metal Oxide Semiconductor (CMOS) image Sensors. CMOS image sensors have received attention because of their relatively low manufacturing cost, low power consumption, and easy integration with a peripheral circuit.

An image sensor included in a smartphone, a tablet PC, a digital camera, and the like, may convert light reflected from an external object into an electrical signal, thereby acquiring image information on the external object and providing that image information as the electrical signal. An image processing device may detect a specific object included in an image from information in the image.

Image data generated from prior art image sensors, however, is clonable. It has therefore been difficult to ensure the uniqueness of an image. Image data uniqueness has recently been ensured using a non-fungible token or the like on a block chain. Although a non-fungible token has been used, whether an image captured by an image sensor has been cloned, cannot be determined and the identity of information of a particular image sensor from which a captured image was obtained also cannot be recognized or determined.

SUMMARY

An image processing device, and an associated method, generates a physical intrinsic identification key for a particular image sensor from noise information. The image processing device, and generates intrinsic image data, including a physical intrinsic identification key for the image sensor.

In accordance with an aspect of the present disclosure, there is provided an image processing device including: a noise information manager configured to manage noise information of a target image sensor and manage noise information of a reference image sensor. The image processing device also includes a physical intrinsic identification key generator configured to determine a physical intrinsic identification key of the target image sensor, and generate a physical intrinsic identification key of the target image sensor, from a difference between noise signals output from pixels of the target image sensor that are adjacent to each other; and, an intrinsic image generator configured to generate intrinsic image data, which includes the physical intrinsic identification key of the target image sensor.

In accordance with another aspect of the present disclosure, there is provided a method of generating a physical intrinsic identification key, the method including: managing noise information of a target image sensor and a reference image sensor; calculating an internal Hamming distance with respect to a physical intrinsic identification key of the target image sensor and a mutual Hamming distance with respect to physical intrinsic identification keys of the target image sensor and the reference image sensor, based on the noise information; determining a size of the physical intrinsic identification key of the target image sensor, based on the internal Hamming distance and the mutual Hamming distance; and generating a physical intrinsic identification key of the target image sensor, which corresponds to the size, based on a difference between noise values of adjacent pixels among pixels included in the target image sensor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions, when shown, may be exaggerated for clarity of illustration. When an element is referred to or described as "between" two delimiting elements, it may be the only element in the space or interval between the two delimiting elements, but there may also be one or more other elements that are also between the delimiting elements. Like reference numerals refer to like-elements throughout this disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to embodiments disclosed herein.

Hereinafter, exemplary embodiments of the present disclosure will be described in detail with reference to the accompanying drawings in order for those skilled in the art to be able to readily implement the technical spirit of the present disclosure.

Figure 1:
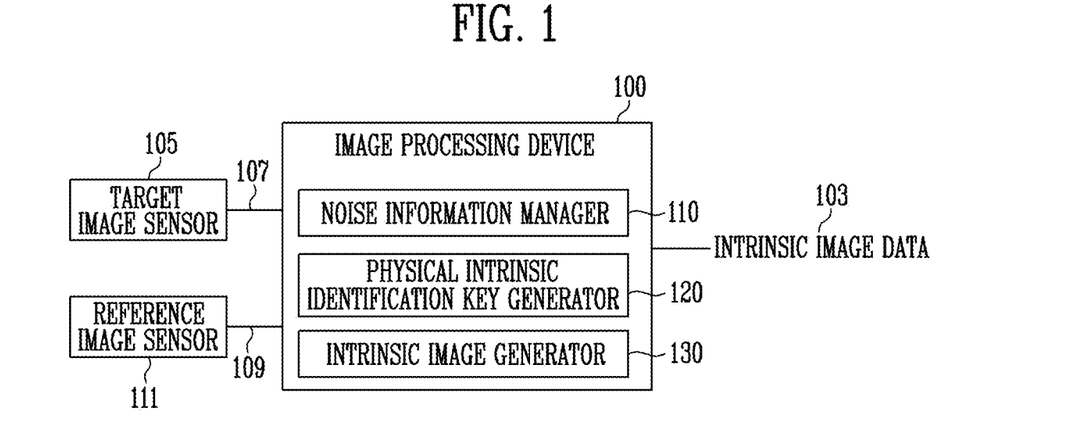
FIG. 1 is a diagram illustrating components of an image processing device in accordance with an embodiment of the present disclosure.

FIG. 1 is a diagram illustrating an image processing device in accordance with an embodiment of the present disclosure.

As used herein and for claim construction purposes, a "physical intrinsic identification key" is a digital word, which is a group of adjacent binary digits, which are operated on as a unit. By way of example, a physical intrinsic identification key may be four, sixteen, thirty-two or more binary digits.

Referring to FIG. 1, the image processing device 100 may generate a physical intrinsic identification key, not shown, of an image sensor, based on noise information received from an external device. The image processing device 100 may output intrinsic image data 103, which includes the generated physical intrinsic identification key.

A virtual image sensor is an image sensor which exists as software running on a computer and is thus a simulated image sensor. A virtual image sensor is thus referred to herein as existing in a digital world but it is not a physical entity. Since a virtual image sensor has no physical feature, image data generated from a virtual image sensor does not have a physical intrinsic identification key. In an embodiment of the present disclosure, the image processing device 100 may generate a physical intrinsic identification key, based on noise information of a target image sensor having a physical entity, which corresponds to a virtual image sensor. The image processing device 100 may generate intrinsic image data by allowing the generated physical intrinsic identification key to be included in image data generated from the virtual image sensor.

In an embodiment of the present disclosure, a physical intrinsic identification key is an intrinsic identifier or "ID" of an actual image sensor, and may uniquely identify an image sensor, by which images output from the uniquely-identified image sensor cannot be cloned. A virtual image sensor, which generates image data, may be identified based on a physical intrinsic identification key included in intrinsic image data.

The image processing device 100 may include a noise information manager 110, a physical intrinsic identification key generator 120, and an intrinsic image generator 130. The image processing device 100 may receive noise information 107 from a target image sensor 105 and noise information 109 from a reference image sensor 111. The image processing device 100 may generate intrinsic image data by adding a physical intrinsic identification key to image data generated from a virtual image sensor.

The noise information manager 110 may manage the noise information 107 received from the target image sensor 105. The noise information manager may also manage noise information 109 from the reference image sensor 111.

The noise information manager 110 may store noise information 107, 109 from each image sensor 105, 111. In an embodiment of the present disclosure, the target image sensor 105 may be an actual, physical sensor, which corresponds to a virtual image sensor, which generates the image data. The reference image sensor 111 may be physical image sensor which generates noise information that is compared to noise information from the target image sensor.

As described more fully below, the physical intrinsic identification key generator 120 may determine a size of a physical intrinsic identification key of the target image sensor, i.e., determine a number of binary digits required by a physical intrinsic identification key, based on a comparison of noise information 107 output from the target image sensor 105 and noise information 109 output from the reference image sensor 111. More specifically, the physical intrinsic identification key generator 120 may generate a physical intrinsic identification key of the target image sensor, based on the difference between noise values of adjacent pixels (not shown in FIG. 1) in the target image sensor 105.

The intrinsic image generator 130 may generate intrinsic image data including the physical intrinsic identification key of the target image sensor. The intrinsic image generator 130 may generate intrinsic image data by adding the image data generated from the virtual image sensor to the physical intrinsic identification key of the target image sensor.

The intrinsic image generator 130 may generate a non-fungible token as a virtual token for authenticating an owner of the generated intrinsic image data using a block chain technology, based on the intrinsic image data. Generating a non-fungible token is well-known it's a detailed is therefore omitted in the interest of brevity.

In FIG. 1, the image processing device 100 is depicted as being implemented separately from the image sensors 105, 111, i.e., the components of image processing device 100 depicted in FIG. 1 are implemented on the same semiconductor substrate whereas each image sensor 105 and 111 is implemented on two other separate and different substrates. In an alternate and equivalent embodiment, however, the image processing device 100 may be formed on the same chip as the target image sensor 105. The chip in which the image processing device 100 is implemented may thus include at least one image sensor. For example, a stacked CMOS image sensor and the image processing device 100 may be implemented in one chip.

Figure 2:
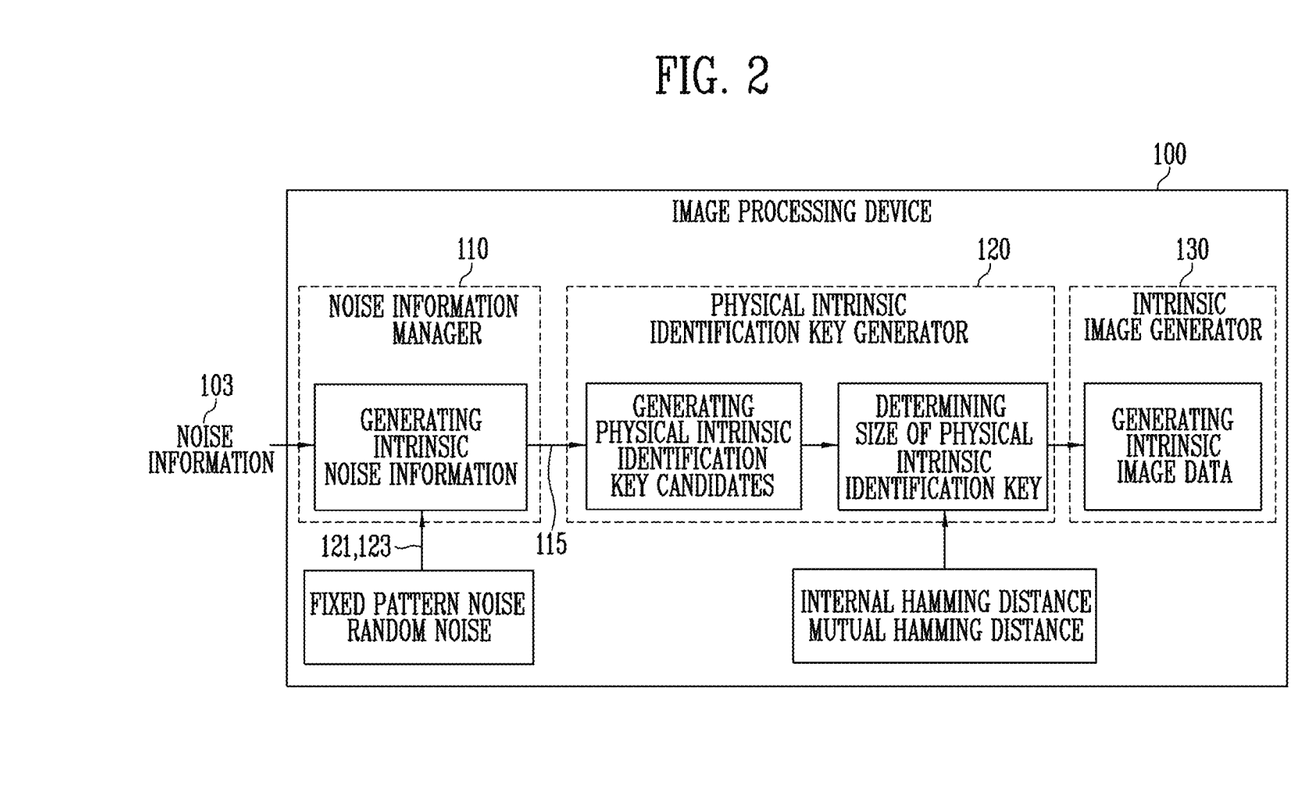
FIG. 2 is a diagram illustrating an image processing device, which generates a physical intrinsic identification key in accordance with an embodiment of the present disclosure.

FIG. 2 is a diagram illustrating an image processing device for generating a physical intrinsic identification key in accordance with an embodiment of the present disclosure.

Referring to FIG. 2, the image processing device 100 may generate a physical intrinsic identification key of a target image sensor 105 shown in FIG. 1, based on noise information of the target image sensor 105 and a reference image sensor 111 also shown in FIG. 1, and generate intrinsic image data including the generated physical intrinsic identification key. Noise information 113 received by the image processing device 100 may be combined noise information from a target image sensor 105 and a reference image sensor 111.

The noise information manager 110 may generate intrinsic noise information 115 obtained by adding a fixed pattern noise 121 and a random noise 123, which correspond to noise from each pixel in the target image sensor 105 and the reference image sensor 111. The fixed pattern noise 121 may represent output homogeneity of an image sensor. The fixed pattern noise may be noise from an amplifier or from an analog-digital converter, for example. The random noise 123 may be image sensor noise and of little impact or importance compared with fixed pattern noise 121.

The fixed pattern noise 121 may have an amplitude and frequency spectrum content, which is or which resembles a log normal distribution. The random noise 123 may have an amplitude and a frequency spectrum content, which is or which resembles a normal, Gaussian distribution.

The noise information manager 110 may add fixed pattern noise 121 of a particular frequency and a random noise. For example, the noise information manager 110 may generate intrinsic noise information 115 for a first pixel of a plurality of pixels in the target image sensor 105. The noise information manager 110 may generate the intrinsic noise information 115 for the first pixel by adding a fixed pattern noise value corresponding to a frequency determined randomly between 0 and 1 and a random noise value determined randomly.

The noise information manager 110 may generate intrinsic noise information 115 for several pixels. For example, the noise information manager 110 may generate intrinsic noise information 115 for thirty-two pixels, 1000 times. Fixed pattern noise values 121 included in the intrinsic noise information 115 are the same for each pixel but random noise values included in the intrinsic noise information may be different for each pixel. A first fixed pattern noise value of a first pixel's first generated intrinsic noise is the same as the fixed pattern noise value of the same first pixel's second and third generated intrinsic noise information. Random noise values included in intrinsic noise information, however, may be different from each other. Since the occurrence frequency of fixed pattern noise 121 included in intrinsic noise information 115 is randomly determined, a fixed pattern noise value corresponding to each pixel may vary, but a fixed pattern noise value corresponding to the same pixel may be maintained even when the intrinsic noise information 115 is generated many times after the occurrence frequency of the fixed pattern noise 121 is determined.

The noise information manager 110 may determine a number of pixels, which generate intrinsic noise information 115, based on the size of a physical intrinsic identification key candidate. Intrinsic noise information 115 may be generated by the number of pixels which generate the intrinsic noise information. For example, when the size of the physical intrinsic identification key candidate is 16 bits, the noise information manager 110 may generate intrinsic noise information 115 on 32 pixels. Similarly, when the size of the physical intrinsic identification key candidate is 1024 bits, the noise information manager 110 may generate intrinsic noise information on 2048 pixels.

The physical intrinsic identification key generator 120 may generate physical intrinsic identification key candidates of the target image sensor 105 and the reference image sensor 111, which have a plurality of different word sizes, based on the intrinsic noise information. The physical intrinsic identification key generator 120 may determine a word size of the physical intrinsic identification key of the target image sensor, based on an internal Hamming distance of physical intrinsic identification key candidates of the target image sensor or a mutual Hamming distance between the physical intrinsic identification key candidates of the target image sensor and physical intrinsic identification key candidates of the reference image sensor. The physical intrinsic identification key generator 120 may determine, as the word size of the physical intrinsic identification key of the target image sensor, a size which is the average of the internal Hamming distance per bit is close to 0, but not equal to zero, or the mutual Hamming distance is close to 0.5 among the physical intrinsic identification key candidates of the target image sensor.

The physical intrinsic identification key generator 120 may generate physical intrinsic identification key candidates, based on a difference between noise values of adjacent pixels. For example, the physical intrinsic identification key generator 120 may compare a noise value of the first pixel with a noise value of a second pixel. The physical intrinsic identification key generator 120 may determine, as 1 or 0, a bit value corresponding to the first pixel, based on a result obtained by comparing the noise values. In the same method, the physical intrinsic identification key generator 120 may determine bit values corresponding to the size of the physical intrinsic identification key candidates, and generate physical intrinsic identification key candidates including the bit values.

A Hamming distance may mean a number with which bit values corresponding to each other do not accord with each other between binary codes having the same size. For example, a Hamming distance between 10101010 and 10011010 is 2, and an average of the Hamming distance per bit is 0.25 as a value obtained by dividing the Hamming distance by a bit number. The internal Hamming distance may represent a Hamming distance between physical intrinsic identification key candidates generated from intrinsic noise information of the same image sensor, and the mutual Hamming distance may represent a Hamming distance between physical intrinsic identification key candidates generated based on intrinsic noise information of different image sensors. As the internal Hamming distance is closer to 0, this is more ideal, and the same physical intrinsic identification key may be generated even when physical intrinsic identification keys are generated several times from an image sensor.

In an embodiment of the present disclosure, the physical intrinsic identification key generator 120 may generate first physical intrinsic identification key candidates of the target image sensor, which have a first size. It may also generate second physical intrinsic identification key candidates of the target image sensor, which have a second and different size, the sizes being determined by the number of times intrinsic noise information is generated, based on intrinsic noise information. The physical intrinsic identification key generator 120 may calculate a first internal Hamming distance of the first physical intrinsic identification key candidates and a second internal Hamming distance of the second physical intrinsic identification key candidates, and determine, as the size of the physical intrinsic identification key of the target image sensor, a size of a physical intrinsic identification key, with which the internal Hamming distance of the target image sensor is close to but not equal to zero.

In another embodiment of the present disclosure, the physical intrinsic identification key generator 120 may generate first physical intrinsic identification key candidates of the target image sensor, having a first size, and second physical intrinsic identification key candidates of the target image sensor, having a second size, the sizes of the candidates being determined by a number of times the intrinsic noise information is generated, based on the intrinsic noise information. The physical intrinsic identification key generator 120 may generate third physical intrinsic identification key candidates of the reference image sensor, which correspond to the first size, and fourth physical intrinsic identification key candidates of the reference image sensor, which correspond to the second size, their sizes being determined by a number of times the intrinsic noise information is generated, based on the intrinsic noise information. The physical intrinsic identification key generator 120 may calculate a first internal Hamming distance of the first physical intrinsic identification key candidates and a second internal Hamming distance of the second physical intrinsic identification key candidates. The physical intrinsic identification key generator 120 may calculate a first mutual Hamming distance between the first physical intrinsic identification key candidates and the third physical intrinsic identification key candidates and a second mutual Hamming distance between the second physical intrinsic identification key candidates and the fourth physical intrinsic identification key candidates. The physical intrinsic identification key generator 120 may determine, as the size of the physical intrinsic identification key of the target image sensor, a size with which an average of the internal Hamming distances is close to but not necessarily equal to zero (0) and an average of the mutual Hamming distances close to but not necessarily equal to 0.5 among first to second sizes.

The physical intrinsic identification key generator 120 may generate a physical intrinsic identification key of the target image sensor, the size of which corresponds to the determined size. The physical intrinsic identification key generator 120 may compare noise values of adjacent pixels among the pixels included in the target image sensor, and generate a physical intrinsic identification key, by comparing the noise values. In an embodiment of the present disclosure, the physical intrinsic identification key 120 may determine, as the physical intrinsic identification key of the target image sensor, a candidate corresponding to the determined size among the pre-generated physical intrinsic identification key candidates.

The intrinsic image generator 130 may generate intrinsic image data including the physical intrinsic identification key of the target image sensor. The intrinsic image generator 130 may add up image data generated from a virtual image sensor and the physical intrinsic identification key of the target image sensor. The intrinsic image data may include information representing that the target image sensor is generated from the virtual image sensor implemented in a digital world.

Figure 3:
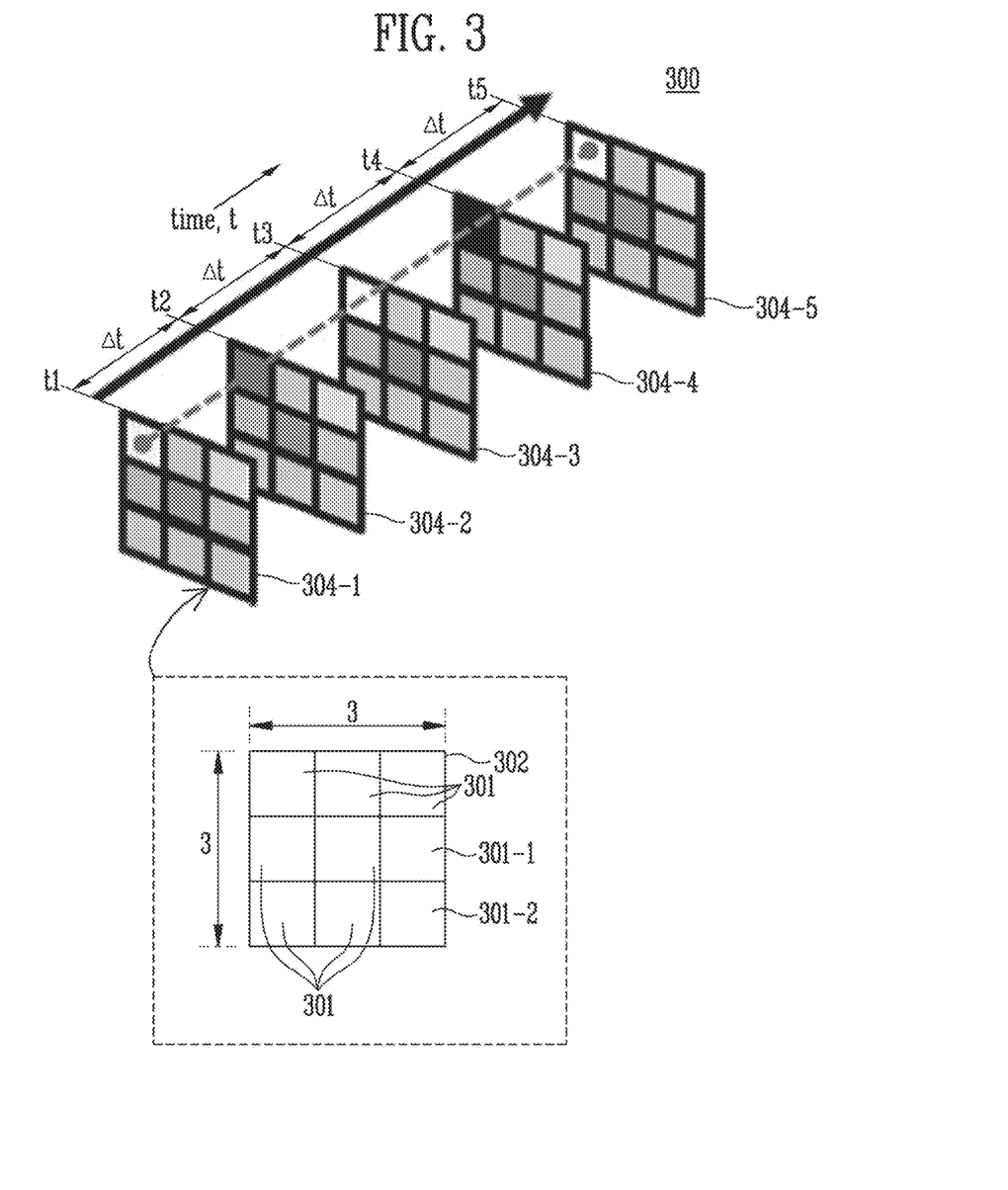
FIG. 3 is a diagram illustrating the collection of noise information from adjacent pixels of an image sensor for five (5) temporally successive image frames captured by the image sensor.

FIG. 3 is a diagram illustrating pixels of an image sensor 300 during five, temporally successive time periods, each of which has a time duration of Δt.

For description simplification purposes, it may be assumed that the pixels 301 comprising an image sensor are arranged in a 3*3 matrix 302. The pixels 301 receive light, which forms an image. In FIG. 3, each of the nine (9) pixels identified by reference numeral 301, that form a 3×3 pixel matrix 302 may capture light energy that forms one image frame 304. In FIG. 3, each image formed by the nine pixels 301 is an image frame. In FIG. 3, 5, temporally-successive image frames identified by reference numerals 304-1-304-5, are "captured" at discrete instances of time, t1-t5, which are temporally separated from each other by the same time interval, Δt. For purposes of this disclosure, the number of frames used to generate noise information may vary, i.e., the number of frames may be greater than or less than five.

Still referring to FIG. 3, image noise may be generated by each pixel 301 of each frame 304-1-304-5. It may be assumed that each pixel 301 of each frame 304 generates both fixed pattern noise and random noise. Each pixel's noise may be generated based on or corresponding to a pixel value generated in a low-luminance or "dark" room, i.e., little or no ambient light.

Pixel values of each pixel 301 corresponding to a plurality of frames 304-1-304-5 may be acquired by operating the image sensor 300 in a low-light environment for the time required to capture successive image frames. In the case of fixed pattern noise, exposure time of the image sensor 300 may be changed to equal or substantially equal the time required to capture all five successive frames 304-1-304-5 so that pixel values of all five frames may be acquired. As shown in in FIG. 3, the time required to acquire five frames is four Δt intervals.

A fixed pattern noise value corresponding to the noise from each of the pixels may be an arithmetic average value of forty-five (45) pixel values, i.e., (9 pixels/frame×5 frames), acquired by all nine pixels of each frame of the five captured frames 304-1-304-5. In the case of random noise, exposure time of the image sensor 300 may be a time interval or period corresponding to the time required to capture five successive image frames 304-1-304-5 and acquiring the pixel values of each frame of the plurality of frames. A random noise value corresponding to each of the pixels may be a standard deviation of the forty-five acquired pixel values.

In an embodiment of the present disclosure, the fixed pattern noise value as well as the random noise value may be determined based on pixel values acquired during about 30 successive captured image frames.

Figure 4A:
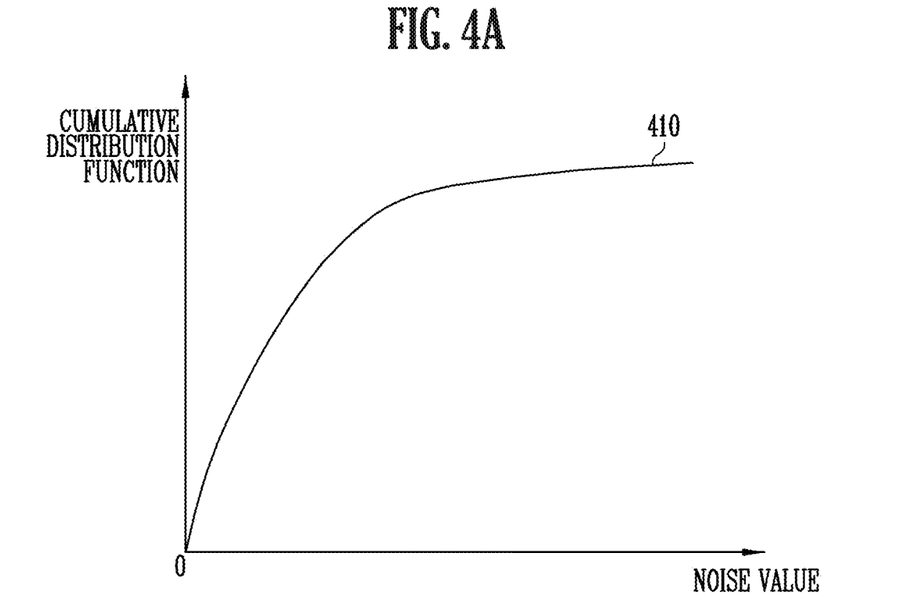
FIG. 4A and FIG. 4B are graphical illustrations of a fixed pattern noise and random noise distributions.
Figure 4B:
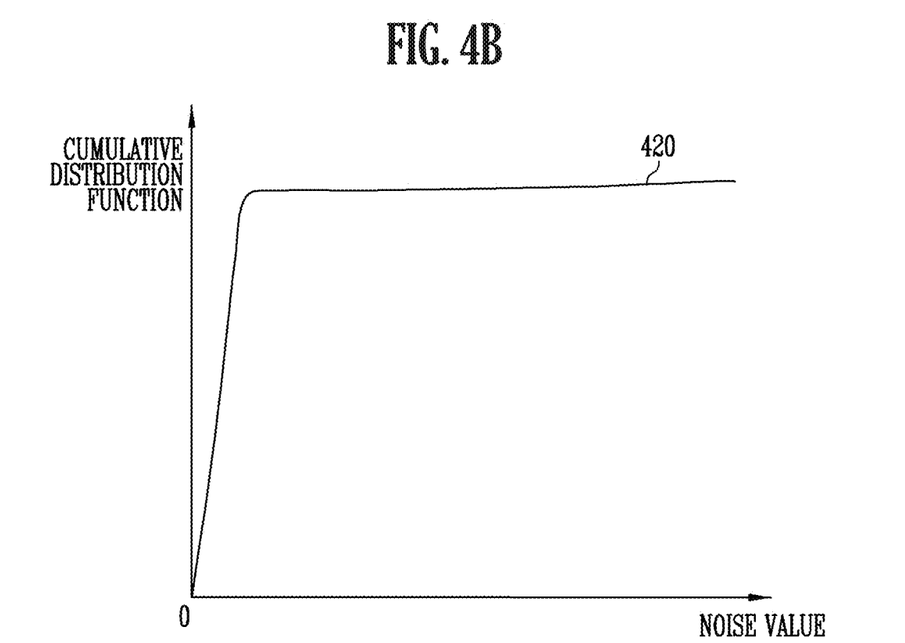

FIG. 4A is a diagram illustrating fixed pattern noise distribution. FIG. 4B is a diagram illustrating random noise distribution. More particularly, reference numeral 410 may represent a relationship of a fixed pattern noise value and the cumulative distribution function. Reference numeral 420 may represent a relationship of a random noise value and the cumulative distribution function.

The relationship of the fixed pattern noise value and the cumulative distribution function may be, or may be substantially the same as, a log-normal distribution. The relationship of the random noise value and the cumulative distribution function may be, or may be substantially the same as a normal, i.e., Gaussian distribution.

The noise information manager 110 shown in FIG. 2 may generate intrinsic noise information corresponding to a pixel by adding a fixed pattern noise values and a random noise values which correspond to a randomly determined occurrence frequency. A method of generating a fixed pattern noise value may be described with the aid of FIG. 2.

Figure 5:
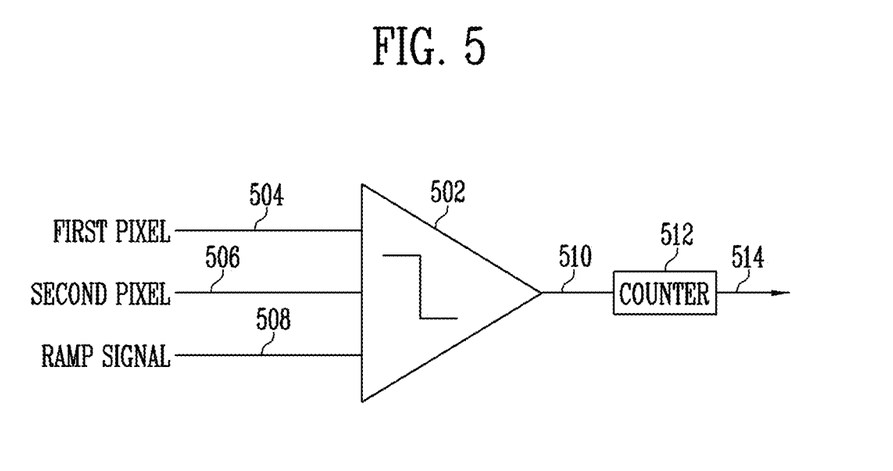
FIG. 5 illustrates conceptually, the comparison of noise values output from adjacent pixels using a comparator and a ramping (e.g., saw tooth) output voltage.

FIG. 5 depicts a three-input comparator 502, illustrating conceptually the comparison of adjacent pixel output noise.

Referring to FIG. 5, a first noise signal (value) 504 generated by a first pixel of an image sensor (not shown), a second noise signal (value) 506 generated by a second pixel of the same image sensor, and a ramp signal 508 may be input to a three-input comparator 502. The ramp signal 508 is preferably a voltage that increases linearly over time, an example of which is a saw tooth wave. The output 510 of the comparator 502 may be input to a counter 512, which outputs a digital word.

The noise generated by the first pixel, 301-1 for instance, may be intrinsic noise information obtained by adding a fixed pattern noise value and a random noise value. For explanation purposes, it should be assumed that the first pixel and the second pixel are pixels in the sensor that are physically adjacent to each other, such as the pixels in FIG. 3 identified by reference numeral 301-1 and 301-2.

The first pixel, 301-1, not shown in FIG. 5, may include or be coupled to a first capacitor (not shown in FIG. 5), which stores the first noise signal of the first pixel(value). Similarly, the second pixel, 301-2 for instance, not shown in FIG. 5, may include or be coupled to a second capacitor (not shown in FIG. 5) which stores the second noise value for the second pixel. Since a capacitor stores electrical charge, i.e., a voltage, the first noise value and the second noise value may therefore be voltages, which are analog signals. The first capacitor and the second capacitor may transfer, to corresponding inputs of the comparator 502, the analog signals embodied as charges (voltages) stored in the first and second capacitors, responsive to a select signal, not shown in FIG. 5.

In an embodiment of the present disclosure, the first pixel and the second pixel may be located on the same column of an image sensor, similar to the pixels in FIG. 3 which are identified by reference numerals 301-1 and 301-2. Output signals of two, physically adjacent pixels located in the same column of a matrix of pixels of an image sensor, may be sequentially transferred to, i.e., input to one of input 504 and 506 of the comparator 502. A noise value may be included in the signals output from each pixel and input to the comparator 502. In an embodiment, one of the first noise value and the second noise value may be selectively and successively (one after the other) transferred (input) to a corresponding input of the comparator 502, responsive to (controlled by) the select signal. Only one of the first noise value and the second noise value are transferred to the comparator together. Two noise values are not transferred to the comparator 502 together or at the same time.

The comparator 502 may output a first comparison signal 510 obtained by comparing the ramp signal voltage 508 to the first noise value 504, which is the voltage stored in the first capacitor. The counter 512 may output a first count value 514, the count value of which represents the ramp signal amplitude at which the first noise value 504 (i.e., the voltage stored in the first capacitor) is greater than the amplitude of the ramp signal 508. Similarly, the counter may output a second count value the count value which represents the ramp signal amplitude at which the second noise value 506 (i.e., the voltage stored in the second capacitor) is greater than the amplitude of the ramp signal 508. Between the first and second pixel noise signals that are successively input to the comparator 502, both of which are compared to the ramp signal's increasing amplitude, the pixel which outputs the largest noise value (i.e., the largest voltage stored in a corresponding capacitor) can be determined by comparing the first count value for the first pixel to the second count value for the second pixel.

The physical intrinsic identification key generator 120 shown in FIG. 2 may then generate a physical intrinsic identification key of an image sensor, based on a difference between the noise values of the first pixel and the second pixel. For example, data corresponding to the first pixel in the physical intrinsic identification key of the image sensor may be 0 or 1. When the noise value of the first pixel is greater than or equal to the noise value of the second pixel, the data corresponding to the first pixel may be determined as 1. On the contrary, when the noise value of the first pixel is smaller than the noise value of the second pixel, the data corresponding to the first pixel may be determined as 0.

In the same manner, data corresponding to each of first to nth pixels may be determined as 0 or 1. The physical intrinsic identification key of the image sensor may be a bit value obtained by sequentially listing data respectively corresponding to the first to nth pixels.

In an embodiment of the present disclosure, the foregoing method of comparing pixel noise value amplitudes and determining which of two pixels produce the larger amplitude noise signal may be performed using a comparator shown in FIG. 5.

Figure 6:
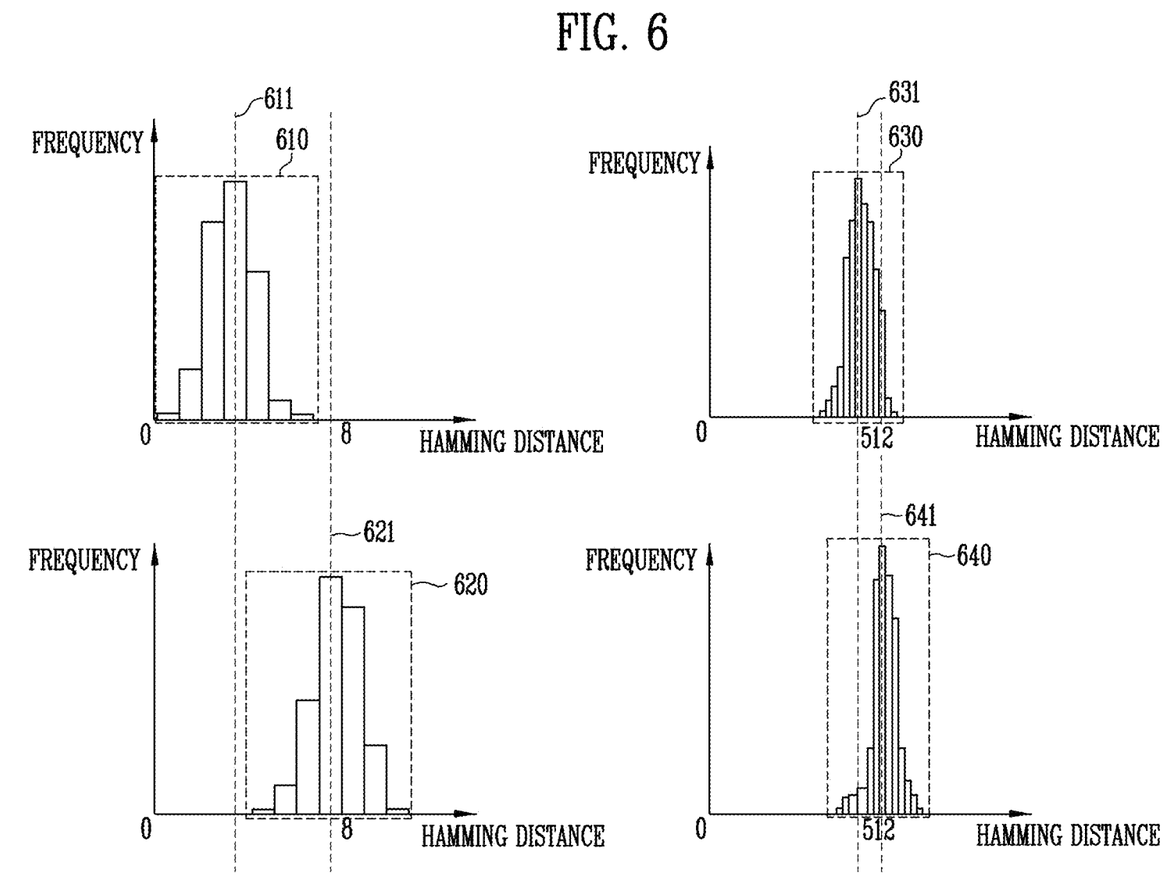
FIG. 6 contains diagrams illustrating conceptually, the determination of a size of a physical intrinsic identification key in accordance with an embodiment of the present disclosure.

FIG. 6 is a diagram a method of determining a size of a physical intrinsic identification key in accordance with an embodiment of the present disclosure.

FIG. 6 illustrates Hamming distance and frequencies of physical intrinsic identification key candidates. Reference numeral 610 identifies first internal Hamming distances and frequencies of first physical intrinsic identification key candidates of a target image sensor, which correspond to a first size. Reference numeral 620 identifies first mutual Hamming distances and frequencies of the first physical intrinsic identification key candidates and third physical intrinsic identification key candidates of a reference image sensor, which correspond to the first size. Reference numeral 630 identifies second internal Hamming distances and frequencies of second physical intrinsic identification key candidates of the target image sensor, which correspond to a second size. Reference numeral 640 identifies second mutual Hamming distances and frequencies of the second physical intrinsic identification key candidates and fourth physical intrinsic identification key candidates of the reference image sensor, which correspond to the second size.

In FIG. 6, an average of the first internal Hamming distances 611, an average of the first mutual Hamming distances 621, an average of the second internal Hamming distances 631, and an average of the second mutual Hamming distances 641 may be illustrated.

The physical intrinsic identification key generator 120 may generate the first physical intrinsic identification key candidates and the second physical intrinsic identification key candidates by a number of times that intrinsic noise information is generated by the noise information manager 110. The physical intrinsic identification key generator 120 may similarly generate the third physical intrinsic identification key candidates and the fourth physical intrinsic identification key candidates.

The physical intrinsic identification key generator 120 may calculate a first internal Hamming distance, based on the first physical intrinsic identification key candidates. The physical intrinsic identification key generator 120 may calculate a mutual Hamming distance between the first physical intrinsic identification key candidates and the third physical intrinsic identification key candidates. For example, a Hamming distance between 110101010000111 and 110101100100011 is 2. The physical intrinsic identification key generator 120 may calculate a Hamming distance of physical intrinsic identification key candidates having the same size.

In FIG. 6, the average of the first internal Hamming distances 611 may be closer to 0 than 8, as a half of the first size, and the average of the first mutual Hamming distances 621 may be closer to 8 selected from 0 and 8. In an embodiment of the present disclosure, a value obtained by dividing an average of mutual Hamming distances by a size of physical intrinsic identification key candidates may be an average of the mutual Hamming distances per bit.

When an average of two physical intrinsic identification key candidates per bit is close to 0, it may be decided that the two physical intrinsic identification key candidates have been generated from the same image sensor. When an average of two physical intrinsic identification key candidates per bit is close to 0.5, the two physical intrinsic identification key candidates may be considered to have been generated from different image sensors.

In FIG. 6, since a difference between the average of the first internal Hamming distances 611 and the average of the first mutual Hamming distances 621 is greater than 25% of the first size, the physical intrinsic identification key generator 120 may decide that the average of the first internal Hamming distances 611 and the average of the first mutual Hamming distances 621 are sufficiently spaced apart from each other. The physical intrinsic identification key generator 120 may determine, as the size of the physical intrinsic identification key of the target image sensor, a size of a physical intrinsic identification key, with which the average of the internal Hamming distances and the average of the mutual Hamming distances are sufficiently spaced apart from each other.

On the contrary, the average of the second internal Hamming distances 631 may be closer to the half value of the second size 512 than to zero, and the average of the second mutual Hamming distances 641 may be closer to the half value 512 from 0 and 512. Since a distance between the average of the second internal Hamming distances 631 and the average of the second mutual Hamming distances 641 is smaller than 20% of the second size, the physical intrinsic identification key generator 120 may decide that the average of the second internal Hamming distances 631 and the average of the second mutual Hamming distances 641 are close to each other. When the average of the internal Hamming distances and the average of the mutual Hamming distances are close to each other, the physical intrinsic identification keys of the target image sensor and the reference image sensor are not distinguished from each other. The physical intrinsic identification key generator 120 may be configured to determine or render the second size unsuitable for the physical intrinsic identification key of the target image sensor.

In another embodiment of the present disclosure, the physical intrinsic identification key generator 120 may compare a first region with respect to an internal Hamming distance of physical intrinsic identification key candidates with a second region with respect to a mutual Hamming distance of the physical intrinsic identification key candidates. The first region may include 610 and 630, which represent a relationship of internal Hamming distances and frequencies, generated from the same image sensor. The second region may include 620 and 640, which represent a relationship of mutual Hamming distances and frequencies, generated from the target image sensor and the reference image sensor.

The physical intrinsic identification key generator 120 may determine a size with which an overlapping portion of the first region and the second region is minimized as the size of the physical intrinsic identification key of the target image sensor. Physical intrinsic identification keys generated from different image sensors may be equal to each other at the overlapping portion of the first region and the second region, and therefore, it may be difficult to identify an image sensor which generates image data. The physical intrinsic identification key generator 120 may determine a size of the physical intrinsic identification key of the target image sensor, which can be distinguished from the physical intrinsic identification key of the reference image sensor, among the plurality of sizes.

In FIG. 6, 16 bits as the first size and 1024 bits as the second size are merely described as an example. The physical intrinsic identification key generator 120 may determine the size of the physical intrinsic identification key of the target image sensor by generating physical intrinsic identification key candidates corresponding to a size of 3 or more.

The physical intrinsic identification key generator 120 may determine a size with which the overlapping portion of the first region and the second region is smallest as the size of the physical intrinsic identification key of the target image sensor.

Figure 7:
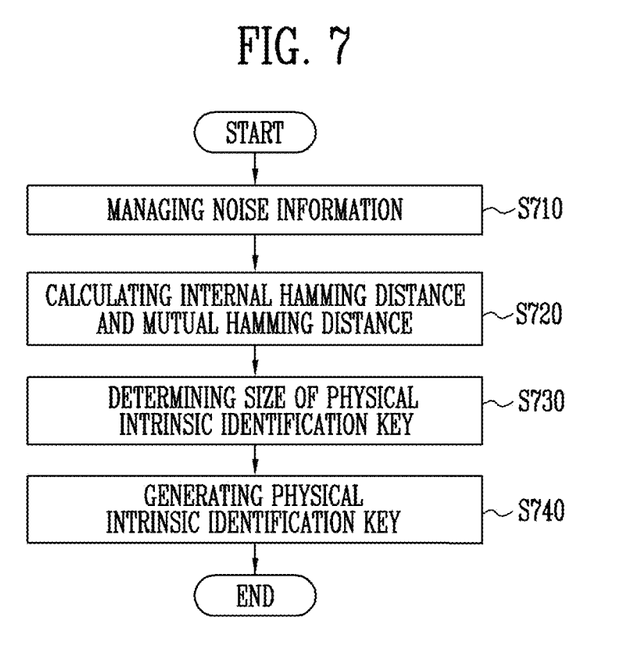
FIG. 7 is a flowchart depicting steps of a method of generating a physical intrinsic identification key in accordance with an embodiment of the present disclosure.

FIG. 7 is a flowchart illustrating a method of generating a physical intrinsic identification key in accordance with an embodiment of the present disclosure. Referring to FIG. 7, the image processing device may generate a physical intrinsic identification key of a target image sensor, based on noise information. FIG. 7 will be described together with the components shown in FIG. 2.

In step S710, the noise information manager 110 may manage noise information of a target image sensor and a reference image sensor. The noise information manager 110 may generate intrinsic noise information by adding fixed pattern noise and random noise, both of which are output from pixel in the target image sensor and the reference image sensor. The noise information manager 110 may generate the intrinsic noise information multiple times. As the number of times the noise information is generated is increased, the accuracy and size of a physical intrinsic identification key may increase accordingly.

In step S720, the physical intrinsic identification key generator 120 may calculate an internal Hamming distance with respect to a physical intrinsic identification key of the target image sensor and a mutual Hamming distance with respect to physical intrinsic identification keys of the target image sensor and the reference image sensor, based on the noise information. In step S730, the physical intrinsic identification key generator 120 may determine a size of the physical intrinsic identification key of the target image sensor, based on the internal Hamming distance and the mutual Hamming distance. The steps S720 and S730 will be described in more detail with reference to FIG. 8.

In step S740, the physical intrinsic identification key generator 120 may generate a physical intrinsic identification key of the target image sensor, which corresponds to the determined size, based on a difference between noise values of adjacent pixels among pixels included in the target image sensor. The step S740 may correspond to the descriptions shown in FIGS. 2 and 5.

After the step S740, the intrinsic image generator 130 may generate intrinsic image data including the physical intrinsic identification key of the target image sensor. The intrinsic image generator 130 may output the intrinsic image data, corresponding to a predetermined command.

Figure 8:
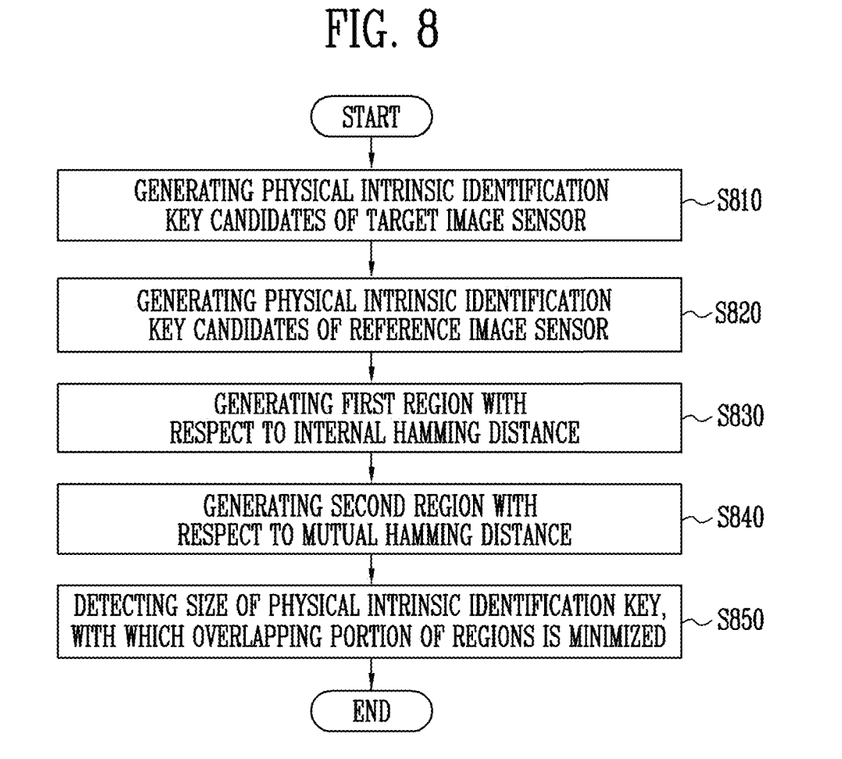
FIG. 8 is a flow chart depicting steps of a method of determining a size of a physical intrinsic identification key in accordance with an embodiment of the present disclosure.

FIG. 8 depicts steps of a method of determining a size of a physical intrinsic identification key in accordance with an embodiment of the present disclosure.

Referring to FIG. 8, physical intrinsic identification key candidates of a target image sensor and a reference image sensor may be generated, and a size of a physical intrinsic identification key of the target image sensor may be determined.

In step S810, the physical intrinsic identification key generator 120 may generate physical intrinsic identification key candidates of a target image sensor, the sizes of which may vary depending on the number of times intrinsic noise information is generated. The physical intrinsic identification key generator 120 may generate first physical intrinsic identification key candidates of the target image sensor, which have a first size It may also generate second physical intrinsic identification key candidates of the target image sensor, which have a second size.

In step S820, the physical intrinsic identification key generator 120 may generate physical intrinsic identification key candidates of a reference image sensor, the sizes of which may vary depending on the number of times intrinsic noise information is generated. The physical intrinsic identification key generator 120 may generate third physical intrinsic identification key candidates of the reference image sensor, which correspond to the first size, and fourth physical intrinsic identification key candidates of the reference image sensor, which correspond to the second size.

In step S830, the physical intrinsic identification key generator 120 may generate a first region with respect to an internal Hamming distance, based on the physical intrinsic identification key candidates of the target image sensor. The physical intrinsic identification key generator 120 may calculate first internal Hamming distances of the first physical intrinsic identification key candidates and second internal Hamming distances of the second physical intrinsic identification key candidates. The physical intrinsic identification key generator 120 may generate the first region, based on the first internal Hamming distances and the second internal Hamming distances.

In step S840, the physical intrinsic identification key generator 120 may generate a second region with respect to a mutual Hamming distance, based on the physical intrinsic identification key candidates of the target image sensor and the physical intrinsic identification key candidates of the reference image sensor. The physical intrinsic identification key generator 120 may calculate first mutual Hamming distances of the first physical intrinsic identification key candidates and the third physical intrinsic identification key candidates and second mutual Hamming distances of the second physical intrinsic identification key candidates and the fourth physical intrinsic identification key candidates. The physical intrinsic identification key generator 120 may generate the second region, based on the first mutual Hamming distances and the second mutual Hamming distances. Descriptions of the first region and the second region may correspond to the descriptions shown in FIG. 6.

In step S850, the physical intrinsic identification key generator 120 may determine the size of the physical intrinsic identification key of the target image sensor, with which an overlapping portion of the first region and the second region is minimized. A method of determining, by the physical intrinsic identification key generator 120, a size of the physical intrinsic identification key of the target image sensor among the plurality of sizes may correspond to the descriptions shown in FIG. 6.

Figure 9:
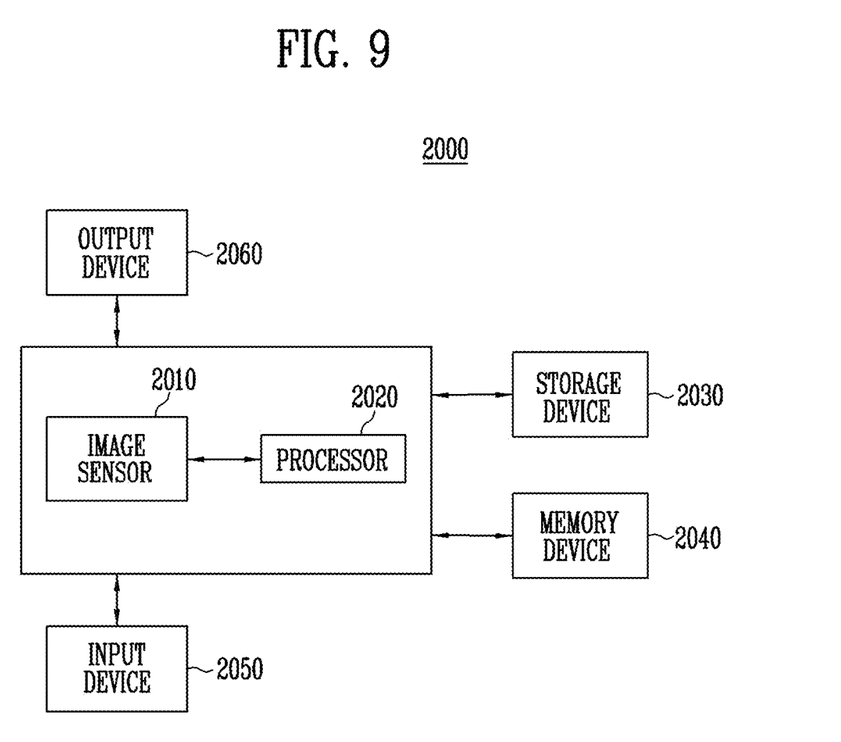
FIG. 9 depicts components of an electronic device, including an image processing device in accordance with an embodiment of the present disclosure.

FIG. 9 is a block diagram illustrating an electronic device including an image processing device in accordance with an embodiment of the present disclosure.

Referring to FIG. 9, the electronic device 2000 may be embodied as software, i.e., program instructions, which when executed by one or more processors, provide the functionality described above.

As shown in FIG. 9, the electronic device may include an image sensor 2010, at least one processor 2020, a storage device 2030, a memory device 2040, an input device 2050, and an output device 2060. Although not shown in FIG. 9, the electronic device 2000 may further include input/output (I/O) ports configured to communicate with a video card, a memory card, a sound card, a USB device, and the like, or communicating with other electronic devices.

The image sensor 2010 may generate output signals, i.e., image data, corresponding to light that strikes the image sensor 2010. In an embodiment of the present disclosure, the image sensor 2010 may include a virtual image sensor, which is simulated by software running on the processor 2020 (or another processor) Because the virtual processor is simulated by a computer and software, the virtual processor is considered herein as being implemented in a digital world. The virtual image sensor may "sense" shapes that visually implemented in software, i.e., the digital world, and generate corresponding virtual image data corresponding to a corresponding virtual sensing result.

The output device 2060 may display the image data. The storage device 2030 may store the image data. The processor 2020 may control operations of the image sensor 2010, the output device 2060, and the storage device 2030.

The processor 2020 may be either a conventional microprocessor or an image processing device, which processes pixel data received from the image sensor 2010 and outputs processed image data. The processing performed by the processor 2020 may include but it is not limited to, Electronic Image Stabilization (EIS), interpolation, color tone correction, image quality correction, size adjustment, and the like.

The processor 2020 may also be implemented on its own semiconductor substrate, separate, apart and independent of substrate on which the image sensor 2010 is formed. For example, the processor 2020 may be implemented as part of a multi-chip package. In another embodiment of the present disclosure, the processor 2020 may be included as a portion of and on the same semiconductor substrate as the image sensor 2010.

The processor 2020 may execute and control overall operation of the electronic device 2000. In accordance with an embodiment of the present disclosure, the processor 2020 may be a microprocessor, a Central Processing Unit (CPU), or an Application Processor (AP). The processor 2020 may be connected to the storage device 2030, the memory device 2040, the input device 2050, and the output device 2060 through an address bus, a control bus, and a data bus, to perform communication.

In an embodiment of the present disclosure, the processor 2020 may receive and store noise information (i.e., noise signals or signals that include noise) output from image sensors. As described above, the processor 2020 may determine a size of a physical intrinsic identification key of a target image sensor, based on sensor noise information. The processor 2020 may generate a physical intrinsic identification key of the target image sensor, based on differences of noise values output from of target image sensor, pixels that are adjacent to each other. The processor 2020 may generate intrinsic image data including the physical intrinsic identification key of the target image sensor. The processor 2020 may calculate an internal or mutual Hamming distance of the target image sensor and a reference image sensor, based on the noise information, and determine a size of the physical intrinsic identification key of the target image sensor among a plurality of sizes, based on the calculated Hamming distance. The size of the physical intrinsic identification key of the target image sensor may be a size with which the physical intrinsic identification key of the target image sensor and a physical intrinsic identification key of the reference image sensor are most different from each other.

The storage device 2030 may include a flash memory device, a Solid State Drive (SSD), a Hard Disk Drive (HDD), a CD-ROM, all types of nonvolatile memory devices, and the like.

The memory device 2040 may store data necessary for an operation of the electronic device 2000. For example, the memory device 2040 may include a volatile memory device such as a Dynamic Random Access Memory (DRAM) or a Static Random Access Memory (SRAM) and a nonvolatile memory device such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing a command set stored in the memory device 2040.

The input device 2050 may include devices such as a keyboard, a keypad, or a mouse. The output device 2060 may include devices such as a printer or a display.

The image sensor 2010 may be implemented with various types of packages. For example, components of at least a portion of the image sensor 2010 may be implemented by using packages such as Package-on-Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), Thin Quad Flat Pack (TQFP), System In Package (SIP), Multi-Chip Package (MCP), Wafer-level Fabricated Package (WFP), Wafer-level Processed Stack Package (WSP), and Wafer-level Processed Package (WSP).

Those of ordinary skill in the art should recognize that the electronic device 2000 may find use with any device or system using an image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with the present disclosure, a physical intrinsic identification key can be included in image data generated from a virtual image sensor not having a physical embodiment. e. And, there is provided an image processing device, which generates a physical intrinsic identification key having an optimum size, which is determined by comparing noise information of a plurality of image sensors to each other. The physical intrinsic identification key associated with a captured image, makes it virtually impossible to represent a mere duplicate of the captured image, which will not have the same physical intrinsic identification key.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, steps may be selectively performed or parts of steps and may be omitted. In each embodiment, the steps are not necessarily performed in accordance with the described order and their order may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Exemplars of the present disclosure have been described in this written description and depicted in the drawings. Terms used herein should not be construed as limiting because they only used to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing device comprising:
  a noise information manager configured to manage noise information of a target image sensor and manage noise information of a reference image sensor;
  a physical intrinsic identification key generator configured to:
    calculate an internal Hamming distance with respect to a physical intrinsic identification key of the target image sensor and a mutual Hamming distance with respect to physical intrinsic identification keys of the target image sensor and the reference image sensor, based on the noise information;
    determine a size of the physical intrinsic identification key of the target image sensor based on the internal Hamming distance and the mutual Hamming distance; and
    generate the physical intrinsic identification key of the target image sensor, from a difference between noise signals output from pixels of the target image sensor that are adjacent to each other; and
  an intrinsic image generator configured to generate intrinsic image data, which includes the physical intrinsic identification key of the target image sensor.

2. The image processing device of claim 1, wherein the noise information manager is configured to generate intrinsic noise information by adding a fixed pattern noise and a random noise for each pixel of a plurality of pixels of the target image sensor and included in the reference image sensor.

3. The image processing device of claim 2, wherein the noise information manager is configured to add the fixed pattern noise corresponding to an occurrence frequency and the random noise, and wherein the noise information manager is configured to generate the intrinsic noise information a plurality of times.

4. The image processing device of claim 2, wherein the fixed pattern noise has a noise amplitude and an occurrence frequency, which is substantially the same as a log normal distribution, and
  the random noise has a noise amplitude and an occurrence frequency, which is substantially the same as a normal, Gaussian distribution.

5. The image processing device of claim 2, wherein the physical intrinsic identification key generator is configured to:
  generate a plurality of physical intrinsic identification key candidates of the target image sensor and of the reference image sensor, the plurality of physical intrinsic identification key candidates being a plurality of different word sizes, determined from the intrinsic noise information, and
  determine the size of the physical intrinsic identification key of the target image sensor, using mutual Hamming distances between physical intrinsic identification key candidates of the target image sensor and physical intrinsic identification key candidates of the reference image sensor.

6. The image processing device of claim 5, wherein the physical intrinsic identification key generator is configured to determine a size of the physical intrinsic identification key of the target image sensor, a size of a physical intrinsic identification key candidate, with which an average of the mutual Hamming distances per bit is closest to 0.5, among the physical intrinsic identification key candidates of the target image sensor.

7. The image processing device of claim 3, wherein the physical intrinsic identification key generator is configured to:
generate first physical intrinsic identification key candidates of the target image sensor, which correspond to a first size; and
generate second physical intrinsic identification key candidates of the target image sensor, which correspond to a second size, the generated first and second physical intrinsic identification key candidates being determined by a number of times the intrinsic noise information is generated, based on the intrinsic noise information;
wherein the physical intrinsic identification key generator is additionally configured to calculate a first internal Hamming distance of the first physical intrinsic identification key candidates and a second internal Hamming distance of the second physical intrinsic identification key candidates; and
determine a size of the physical intrinsic identification key of the target image sensor, and a size of a physical intrinsic identification key candidate, with which the internal Hamming distance of the target image sensor is substantially but not equal to zero.

8. The image processing device of claim 3, wherein the physical intrinsic identification key generator is configured to:
generate first physical intrinsic identification key candidates of the target image sensor, which correspond to a first size;
generate second physical intrinsic identification key candidates of the target image sensor, which correspond to a second size, the first size and second size being determined by a number of times the intrinsic noise information is generated and intrinsic noise information;
generate third physical intrinsic identification key candidates of the target image sensor, which correspond to the first size; and
generate fourth physical intrinsic identification key candidates of the target image sensor, which correspond to the second size, by the number of times the intrinsic noise information is generated;
and, based on the intrinsic noise information, calculate a first internal Hamming distance of the first physical intrinsic identification key candidates and a second internal Hamming distance of the second physical intrinsic identification key candidates,
calculate a first mutual Hamming distance of the first physical intrinsic identification key candidates and the third physical intrinsic identification key candidates and a second mutual Hamming distance of the second physical intrinsic identification key candidates and the fourth physical intrinsic identification key candidates, and determine a size of the physical intrinsic identification key of the target image sensor, and a size with which an average of the internal Hamming distances per bit is closed to 0 and an average of the mutual Hamming distances per bit is close to 0.5 among the first and second sizes.

9. The image processing device of claim 1, wherein the intrinsic image generator is configured to generate the intrinsic image data by adding digital data received from a virtual image sensor corresponding to the target image sensor to the physical intrinsic identification key of the target image sensor, and
wherein the virtual image sensor comprises computer program instructions, executed by a processor.

10. A method of generating a physical intrinsic identification key, the method comprising:
managing noise information of a target image sensor and a reference image sensor;
calculating an internal Hamming distance with respect to a physical intrinsic identification key of the target image sensor and a mutual Hamming distance with respect to physical intrinsic identification keys of the target image sensor and the reference image sensor, based on the noise information;
determining a size of the physical intrinsic identification key of the target image sensor, based on the internal Hamming distance and the mutual Hamming distance; and
generating a physical intrinsic identification key of the target image sensor, which corresponds to the size, based on a difference between noise values of adjacent pixels among pixels included in the target image sensor.

11. The method of claim 10, wherein managing noise information includes generating intrinsic noise information obtained by adding a fixed pattern noise and a random noise, both of which correspond to each pixel of a plurality of pixels comprising both the target image sensor and the reference image sensor.

12. The method of claim 11, wherein managing noise information further comprises generating intrinsic noise information a plurality of times.

13. The method of claim 11, wherein the fixed pattern noise has a noise size and an occurrence frequency, which is substantially the same as a log normal distribution, and
the random noise has a noise size and an occurrence frequency, which is substantially the same as a normal distribution.

14. The method of claim 12, wherein the calculating of the internal Hamming distance and the mutual Hamming distance comprises;
generating physical intrinsic identification key candidates of the target image sensor, which correspond to a plurality of sizes, the sizes being determined by the number of times intrinsic noise information is generated;
generating physical intrinsic identification key candidates of the reference image sensor, which correspond to the plurality of sizes, the sizes being determined by the number of times intrinsic noise information is generated;
generating a first region with respect to the internal Hamming distance, based on the physical intrinsic identification key candidates of the target image sensor; and
generating a second region with respect to the mutual Hamming distance, based on the physical intrinsic identification key candidates of the target image sensor and the physical intrinsic identification key candidates of the reference image sensor.

15. The method of claim 14, wherein the determining of the size of the physical intrinsic identification key of the target image sensor includes detecting a size of the physical intrinsic identification key of the target image sensor, with which an overlapping portion of the first region and the second region is minimized.

16. The method of claim 14, wherein the generating of the physical intrinsic identification key candidates of the target image sensor includes generating first physical intrinsic identification key candidates of the target image sensor, which correspond to a first size, and second physical intrinsic identification key candidates of the target image sensor, which correspond to a second size, and wherein the generating of the physical intrinsic identification key candidates of the reference image sensor includes generating third physical intrinsic identification key candidates of the reference image sensor, which correspond to the first size, and fourth physical intrinsic identification key candidates of the reference image sensor, which correspond to the second size.

17. The method of claim 16, wherein the generating of the first region includes:

calculating first internal Hamming distances of the first physical intrinsic identification key candidates and second internal Hamming distances of the second physical intrinsic identification key candidates; and generating the first region, based on the first internal Hamming distances and the second internal Hamming distances.

18. The method of claim 17, wherein the generating of the second region includes:

calculating first mutual Hamming distances of the first physical intrinsic identification key candidates and the third physical intrinsic identification key candidates and second mutual Hamming distances of the second physical intrinsic identification key candidates and the fourth physical intrinsic identification key candidates; and generating the second region, based on the first mutual Hamming distances and the second mutual Hamming distances.

19. The method of claim 10, further comprising generating intrinsic image data including the physical intrinsic identification key of the target image sensor.

* * * * *